United States Patent
Jin et al.

(10) Patent No.: US 12,427,640 B2
(45) Date of Patent: Sep. 30, 2025

(54) SYSTEM AND METHOD OF ADJUSTING SPEED OF ELECTRIC TOOL

(71) Applicant: JIANGSU DONGCHENG TOOLS TECHNOLOGY CO., LTD., Nantong (CN)

(72) Inventors: Yan Jin, Nantong (CN); Jin Qian, Nantong (CN); Chao Zhou, Nantong (CN)

(73) Assignee: JIANGSU DONGCHENG TOOLS TECHNOLOGY CO., LTD., Nantong (CN)

( * ) Notice: Subject to any disclaimer, the term of this patent is extended or adjusted under 35 U.S.C. 154(b) by 0 days.

(21) Appl. No.: 18/461,495

(22) Filed: Sep. 5, 2023

(65) Prior Publication Data
US 2023/0405787 A1 Dec. 21, 2023

Related U.S. Application Data

(63) Continuation of application No. PCT/CN2022/141858, filed on Dec. 26, 2022.

(30) Foreign Application Priority Data

May 24, 2022 (CN) .......................... 202210567267.3

(51) Int. Cl.
*B25F 5/00* (2006.01)
*H02K 7/14* (2006.01)
*H02P 6/08* (2016.01)

(52) U.S. Cl.
CPC ............. *B25F 5/001* (2013.01); *H02K 7/145* (2013.01); *H02P 6/08* (2013.01)

(58) Field of Classification Search
CPC ............ B25F 5/001; H02K 7/145; H02P 6/08
See application file for complete search history.

(56) References Cited

U.S. PATENT DOCUMENTS 5,440,215 A * 8/1995 Gilmore .................. B25F 5/001
388/930
9,312,795 B2 * 4/2016 Ishikawa ................... B25F 5/00
(Continued)

FOREIGN PATENT DOCUMENTS

CN 106114508 A 11/2016
CN 106998168 A 8/2017
(Continued)

OTHER PUBLICATIONS

International Search Report, International Application No. PCT/CN2022/141858, mailed Feb. 9, 2023 (16 pages).
(Continued)

*Primary Examiner* — Dariush Seif

(57) ABSTRACT

For a system of adjusting a speed of an electric tool, a power supply module is connected to an inverter, the inverter is connected to a motor and a controller; the controller is connected to a switch fixed-speed module, a rotational speed display module, and a fixed-speed prompting module. The switch fixed-speed module comprises a switch trigger connected to the controller and is configured to set a target operating speed of the motor based on the amount of turned-on stroke of the switch trigger. The rotational speed displaying module is configured to display a preset operating speed of the motor. The fixed-speed prompting module is configured to prompt a setting state of the target operating speed.

19 Claims, 4 Drawing Sheets

(56) References Cited

U.S. PATENT DOCUMENTS

| | | | | |
|---|---|---|---|---|
| 11,065,754 | B2* | 7/2021 | Watanabe | B25B 23/147 |
| 11,463,027 | B2* | 10/2022 | Ichikawa | H02J 7/0063 |
| 2007/0000676 | A1* | 1/2007 | Arimura | B25B 23/1405 |
| | | | | 173/179 |
| 2012/0169256 | A1* | 7/2012 | Suda | B25B 21/00 |
| | | | | 318/17 |
| 2013/0049643 | A1* | 2/2013 | Kusakawa | B25B 21/00 |
| | | | | 318/9 |
| 2013/0068491 | A1* | 3/2013 | Kusakawa | B25B 21/00 |
| | | | | 173/176 |
| 2014/0091648 | A1* | 4/2014 | Kumagai | H02K 7/145 |
| | | | | 310/50 |
| 2014/0116737 | A1* | 5/2014 | Iwata | B25F 5/02 |
| | | | | 173/20 |
| 2016/0008961 | A1* | 1/2016 | Takano | B25B 23/1475 |
| | | | | 173/2 |
| 2016/0107297 | A1* | 4/2016 | Ishikawa | B25B 23/18 |
| | | | | 173/179 |
| 2017/0133965 | A1* | 5/2017 | Ichikawa | B25F 5/00 |
| 2017/0373615 | A1* | 12/2017 | Lewis | H02K 7/145 |
| 2018/0048252 | A1* | 2/2018 | Yabuguchi | H02P 6/24 |
| 2018/0297179 | A1* | 10/2018 | Osada | B25B 21/008 |
| 2019/0084107 | A1* | 3/2019 | Yabuguchi | H02P 6/24 |
| 2019/0258797 | A1* | 8/2019 | Horie | G06F 21/34 |
| 2020/0313598 | A1* | 10/2020 | Katayama | B25F 5/00 |
| 2020/0343840 | A1* | 10/2020 | Vanko | H02P 6/186 |
| 2020/0389110 | A1* | 12/2020 | Yajurvedi | H02P 3/12 |
| 2021/0094158 | A1* | 4/2021 | Kato | B25B 23/147 |
| 2021/0094163 | A1* | 4/2021 | Kato | B25F 5/00 |
| 2021/0291400 | A1* | 9/2021 | Heinzelmann | B27B 17/08 |
| 2022/0042796 | A1* | 2/2022 | Nishigaki | G01B 21/02 |
| 2022/0055197 | A1* | 2/2022 | Yoshikane | B25D 17/00 |
| 2022/0111506 | A1* | 4/2022 | Herr | B25F 5/02 |
| 2022/0200426 | A1* | 6/2022 | Gohn | H02K 1/16 |
| 2022/0200511 | A1* | 6/2022 | Friedman | B25B 21/026 |
| 2022/0368250 | A1* | 11/2022 | Mckillican | B25F 5/00 |
| 2022/0389727 | A1* | 12/2022 | Ebisawa | E04G 21/08 |
| 2023/0405787 | A1* | 12/2023 | Jin | B25F 5/00 |

FOREIGN PATENT DOCUMENTS

| | | |
|---|---|---|
| CN | 107398908 A | 11/2017 |
| CN | 108778651 A | 11/2018 |
| CN | 110446559 A | 11/2019 |
| CN | 110739890 A | 1/2020 |
| CN | 111775117 A | 10/2020 |
| CN | 112339755 A | 2/2021 |
| CN | 108778651 B | 6/2021 |
| CN | 113119035 A | 7/2021 |
| CN | 106998168 B | 9/2021 |
| CN | 115102460 A | 9/2022 |
| CN | 111775117 B | 6/2023 |
| JP | 2013166246 A | 8/2013 |

OTHER PUBLICATIONS

Chinese First Office Action, Chinese Application No. 202210567267.3, mailed Jan. 15, 2025 (13 pages).

* cited by examiner

SYSTEM AND METHOD OF ADJUSTING SPEED OF ELECTRIC TOOL

CROSS REFERENCE TO RELATED APPLICATIONS

The present application is a continuation application of the international patent application No. PCT/CN2022/141858, filed on Dec. 26, 2022, which claims the priority of Chinese patent application No. 202210567267.3, filed on May 24, 2022, and contents of which are incorporated herein by its entireties.

TECHNICAL FIELD

The present disclosure relates to the field of controlling of electric tools, and in particular to a system and a method of adjusting a speed of an electric tool.

BACKGROUND

Currently, for an electric tool, which has a switch trigger being able to control a speed of the electric tool, as the amount of turned-on stroke of the switch trigger being pressed is increased, an operating speed of a motor is increased accordingly. Conversely, as the amount of the turned-on stroke of the switch trigger being pressed is decreased, the operating speed of the motor is decreased accordingly.

However, when the electric tool is operated by performing the speed control scheme as described above, the operating speed of the motor is limited by the amount of the turned-on stroke of the switch trigger. When the operator desires the electric tool to be used within a specific time period and desires the motor of the electric tool to operate at a specific operating speed, the operator must manually press the switch trigger and maintain the amount of the stroke of the switch trigger at constant. In this way, it may be difficult to control the motor to rotate at the specific operating speed. Especially, the operator, who is continuously using the electric tool for a long time, may be physically tired and less focused, an operating efficiency may be reduced significantly, which may lead to delays in a working schedule, and the operator may be less comfortable.

Therefore, it is necessary to provide a system and a method of adjusting a speed of an electric tool to solve the above technical problem.

SUMMARY OF THE DISCLOSURE

Based on the above technical problems, the present disclosure provides a system and a method of adjusting a speed of an electric tool, technical solutions are as follows.

A system of adjusting a speed of an electric tool includes: a power supply module, a motor, a controller, and an inverter. The power supply module is connected to the inverter, the inverter is connected to the motor and the controller. The controller is connected to a switch fixed-speed module, a rotational speed display module, and a fixed-speed prompting module. The switch fixed-speed module includes at least a switch trigger connected to the controller and is configured to set a target operating speed of the motor based on the amount of turned-on stroke of the switch trigger. The rotational speed displaying module is configured to display a preset operating speed of the motor. The fixed-speed prompting module is configured to prompt a setting state of the target operating speed. After the target operating speed is set, the electric tool, when being started up again, is configured to operate at the target operating speed.

A method of adjusting a speed of an electric tool, including:
S1, powering up the electric tool, the electric tool entering a normal mode;
S2, the normal mode being switched into an intelligent fixed-speed mode by pressing a mode button, adjusting a preset operating speed of a motor of the electric tool to be equal to a target operating speed by continually adjusting the amount of turned-on stroke of a switch trigger and by monitoring the preset operating speed displayed on a display;
S3, in the intelligent fixed-speed mode, a LED lamp being continuously flashing, or a voice player providing a prompt indicating that the target operating speed is in a being-set state, in response to the preset operating speed being equal to the target operating speed and a duration being less than a duration threshold; wherein the duration is timed by the electric tool for a time length that the switch trigger is being pressed and the amount of the turned-on stroke of the switch trigger is kept constant;
S4, the LED lamp emitting light constantly or the voice player providing a prompt indicating that the target operating speed is in the setting-finished state, in response to the preset operating speed being equal to the target operating speed and the duration being greater than or equal to the duration threshold;
S5, the switch trigger being pressed again and then released, and the electric tool operating at the target operating speed.

BRIEF DESCRIPTION OF THE DRAWINGS

Implementations of the present disclosure will be further illustrated in detail by referring to the following drawings.

DETAILED DESCRIPTION

Figure 1:
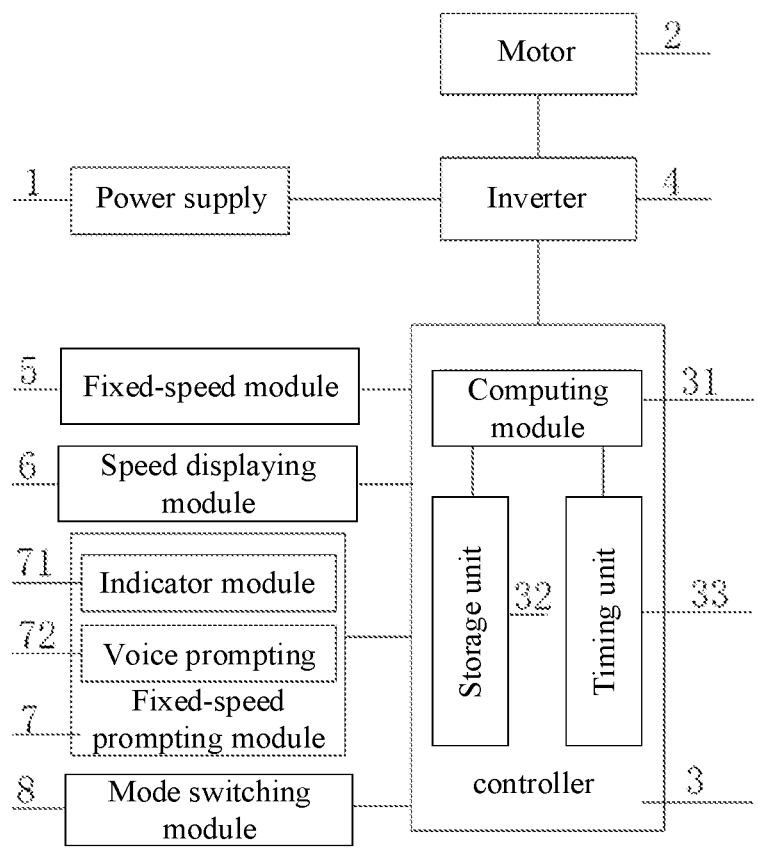
FIG. 1 is a structural diagram of modules of a system of adjusting a speed of an electric tool according to an embodiment of the present disclosure.

The present disclosure is illustrated in the following in more details by referring to the drawings and the embodiments.

Figure 2:
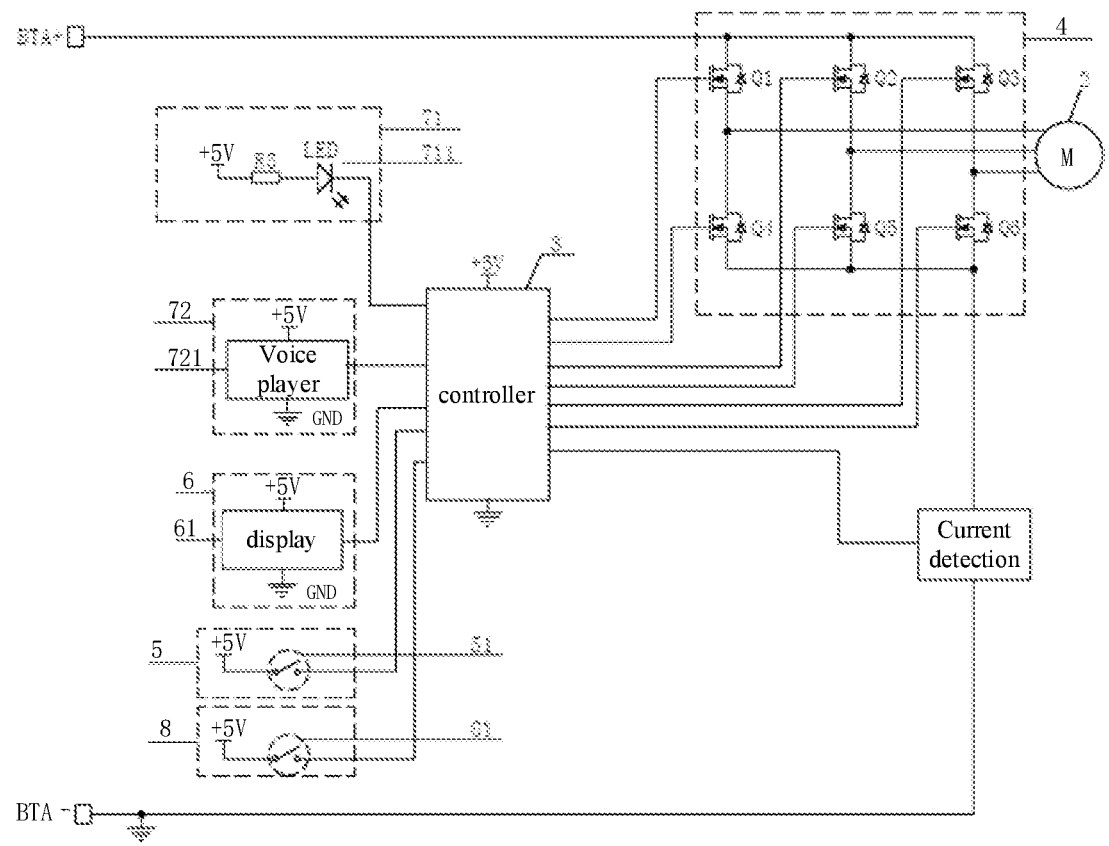
FIG. 2 is a circuit diagram showing a working principle of the system of adjusting the speed of the electric tool according to an embodiment of the present disclosure.

As shown in FIG. 1 and FIG. 2, a system of adjusting a speed of an electric tool includes a power supply module 1, a motor 2, a controller 3, and an inverter 4. The power supply module 1 is connected to the inverter 4. The inverter 4 is connected to the motor 2 and the controller 3. The controller 3 is connected to a switch fixed-speed module 5, a rotational speed display module 6, and a fixed-speed prompting module 7. The switch fixed-speed module 5 includes at least a switch trigger 51 connected to the controller 3 and is configured to set a target operating speed of the motor 2 based on the amount of turned-on stroke of the switch trigger 51. The rotational speed displaying module 6 is configured to display a preset operating speed of the motor 2. The fixed-speed prompting module 7 is configured to prompt a setting state of the target operating speed. After the target operating speed has been set, the electric tool, when being started up again, may operate at the target operating speed. The switch trigger 51 is configured to at least control the motor 2 to be started and stopped. The controller 3 may be configured as an MCU controller.

As shown in FIG. 2, the rotational speed displaying module 6 includes at least a display 61 connected to the controller 3. The preset operating speed is displayed on the display 61. The fixed-speed prompting module 7 employs at least one of an indicator module 71 and a voice prompting module 72. The indicator module 71 includes at least an LED lamp 711. The setting state of the target operating speed is displayed by the LED lamp 711. The voice prompting module 72 includes at least a voice player 721, and the voice player 721 indicates the setting state of the target operating speed.

In the present embodiment, the setting state of the target operating speed includes at least a being-set state and a setting-finished state. In the present embodiment, the switch trigger 51 may be a resistance-variable type of switch. In some embodiments, a VR speed adjustment switch is configured as the switch trigger 51.

Further, as shown in FIG. 1 and FIG. 2, the controller 3 includes at least a computing module 31, a storage unit 32 connected to the computing module 31, and a timing unit 33 connected to the computing module 31. The storage unit 32 stores the preset operating speed corresponding to the amount of the turned-on stroke of the switch trigger 51 and a duration threshold for which the switch trigger 51 is being pressed and the amount of the turned-on stroke of the switch trigger 51 is kept constant. The computing module 31 is configured to calculate the amount of the turned-on stroke of the switch trigger 51 and to obtain the target operating speed by corresponding the calculated amount of the turned-on stroke to the preset operating speed. The timing unit 33 is configured to time a duration for which the switch trigger 51 is being pressed and the amount of the turned-on stroke of the switch trigger 51 is kept constant.

In the present embodiment, the computing module 31 is further configured to control the setting state of the target operating speed by comparing the duration timed by the timing unit 33 to the duration threshold. The duration threshold may be in a range from 1 seconds to 2 seconds. In some embodiments, the duration threshold may be 2 seconds.

As shown in FIG. 1 and FIG. 2, the controller 3 is connected to a mode switching module 8 to control an operating mode of the motor. The operating mode includes at least a normal mode and an intelligent fixed-speed mode. The normal mode is configured to control a real-time operating speed of the motor 2 based on the amount of the turn-on stroke of the switch trigger 51. The intelligent fixed-speed mode is configured to set the target operating speed based on the switch fixed-speed module 5, the rotational speed displaying module 6, and the fixed-speed prompting module 7. The mode switching module 8 includes at least a mode button 81. The mode button 81 is configured to control the motor 2 to be switched between the normal mode and the intelligent fixed-speed mode.

Figure 3:
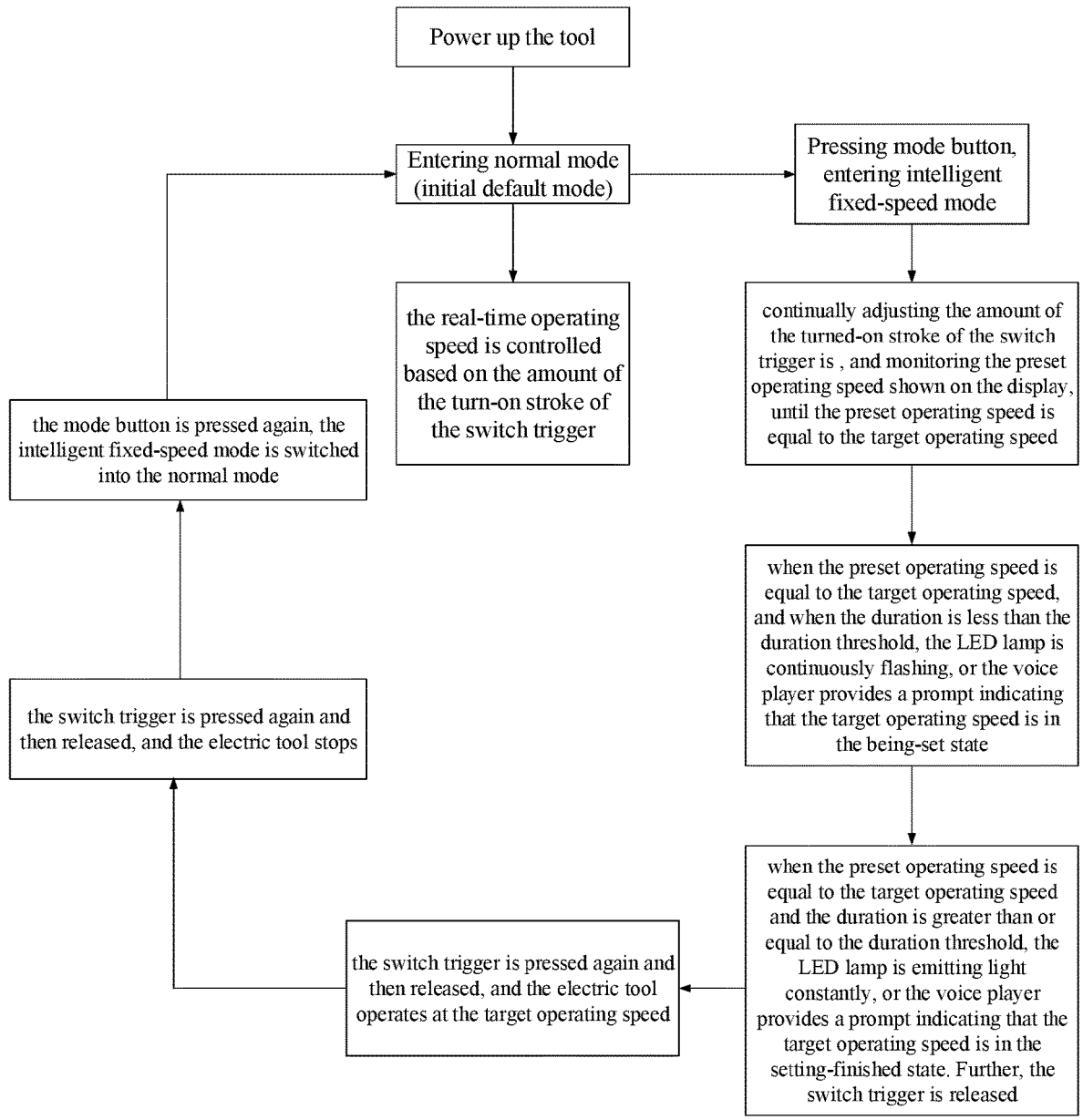
FIG. 3 is a flow chart of a method of adjusting the speed of the electric tool according to an embodiment of the present disclosure.

As shown in FIG. 3, the present disclosure provides a method of adjusting the speed of the electric tool, including following operations.

In an operation S1, the electric tool is powered up and enters the normal mode. In the normal mode, the real-time operating speed is controlled based on the amount of the turn-on stroke of the switch trigger 51. The normal mode is an initial default mode when the electric tool is just powered up.

In an operation S2, the normal mode is switched into the intelligent fixed-speed mode by pressing the mode button 81. In the intelligent fixed-speed mode, the amount of the turned-on stroke of the switch trigger 51 is continually adjusted, and the preset operating speed shown on the display 61 is monitored, until the preset operating speed is equal to the target operating speed.

In an operation S3, in the intelligent fixed-speed mode, when the preset operating speed is equal to the target operating speed, and the duration is less than the duration threshold, the LED lamp 711 is continuously flashing, or the voice player 721 provides a prompt indicating that the target operating speed is in the being-set state.

In an operation S4, when the preset operating speed is equal to the target operating speed and the duration is greater than or equal to the duration threshold, the LED lamp 711 is emitting light constantly, or the voice player 721 provides a prompt indicating that the target operating speed is in the setting-finished state. Further, the switch trigger 51 is released. In the process of setting the target operating speed, the electric tool is stopped.

In an operation S5, the switch trigger 51 is pressed again and then released, and the electric tool operates at the target operating speed.

In an operation S6, the switch trigger 51 is pressed again and then released, and the electric tool stops.

In an operation S7, the mode button 81 is pressed again, the intelligent fixed-speed mode is switched into the normal mode.

When the preset operating speed is not equal to the target operating speed, the LED lamp 711 is continuously flashing, or the voice player 721 provides the prompt indicating that the target operating speed is in the being-set state.

In the present embodiment, the setting state of the target operating speed may be displayed on the display 61. For example, the display 61 displays the being-set state or the setting-finished state.

In the present embodiment, when the electric tool is in the intelligent fixed-speed mode and needs to change to operate at another target operating speed, it can be achieved by the following two options. (1) Firstly, the mode button 81 is pressed to switch the intelligent fixed-speed mode to the normal mode. Further, the mode button 81 is pressed again, the normal mode is switched into the intelligent fixed-speed mode, and the another target operating speed is set. (2) The electric tool is stopped. The switch trigger 51 is being pressed for 2 seconds to 3 seconds to allow the electric tool to directly enter the being-set state of setting the another target operating speed. Further, the operation S3 is performed to set the another target operating speed.

The working principle of the method of adjusting the speed of the electric tool is as follows.

(1) For the normal mode, the operator adjusts, based on the demand of the operating speed of the electric tool, the amount of the turned-on stroke of the switch trigger 51 in real time to adjust the real-time operating speed of the electric tool.

(2) For the intelligent fixed-speed mode (when the target operating speed is V0, the preset operating speed is V1, the duration threshold is T0, and the duration is T1), the amount of the turned-on stroke of the switch trigger 51 may be continuously adjusted to adjust the V1, until the V1 is equal to V0. While adjusting the operating speed, the LED lamp 711 is in a continuous flashing, or the voice player 721 provides the prompt indicating that the V0 is in the being-set state. When the V1 is equal to the V0 and the T1 is less than the T0, the LED lamp 711 is continuously flashing, or the voice player 721 provides the prompt indicating that the target operating speed is in the being-set state. When the V1 is equal to the V0 and the T1 is greater than or equal to the T0, the LED lamp 711 is constantly emitting light, or the voice player 721 provides the prompt indicating that the V0 is in the setting-finished state, and the switch trigger 51 is released, and the V0 is finished setting.

In the present disclosure, the intelligent fixed-speed mode is set for the electric tool. The target operating speed is set cooperatively by the switch fixed-speed module 5, the rotational speed displaying module 6, and the fixed-speed prompting module 7. In this way, the speed can be controlled conveniently and quickly, and demands of the operator about requiring the electric tool to be used within the specific time period and requiring the motor of the electric tool to operate at the specific operating speed may be satisfied. Especially, the operator, who needs to use the electric tool continuously for a long time, does not need to press the switch trigger 51 for a long time. Fingers of the operator are released. Labor intensity is reduced, the operator may not be tired easily, the operating efficiency is greatly improved, and the operator may work comfortably. In addition, adjusting the operating speed by a single mode in the traditional tool is changed according to the present disclosure. The mode button 81 is arranged to allow the electric tool to be switched between the ordinary mode and the intelligent fixed-speed mode. The dual-mode operation allows various demands of the operator to be met, and the speed may be controlled highly flexibly.

Figure 4:
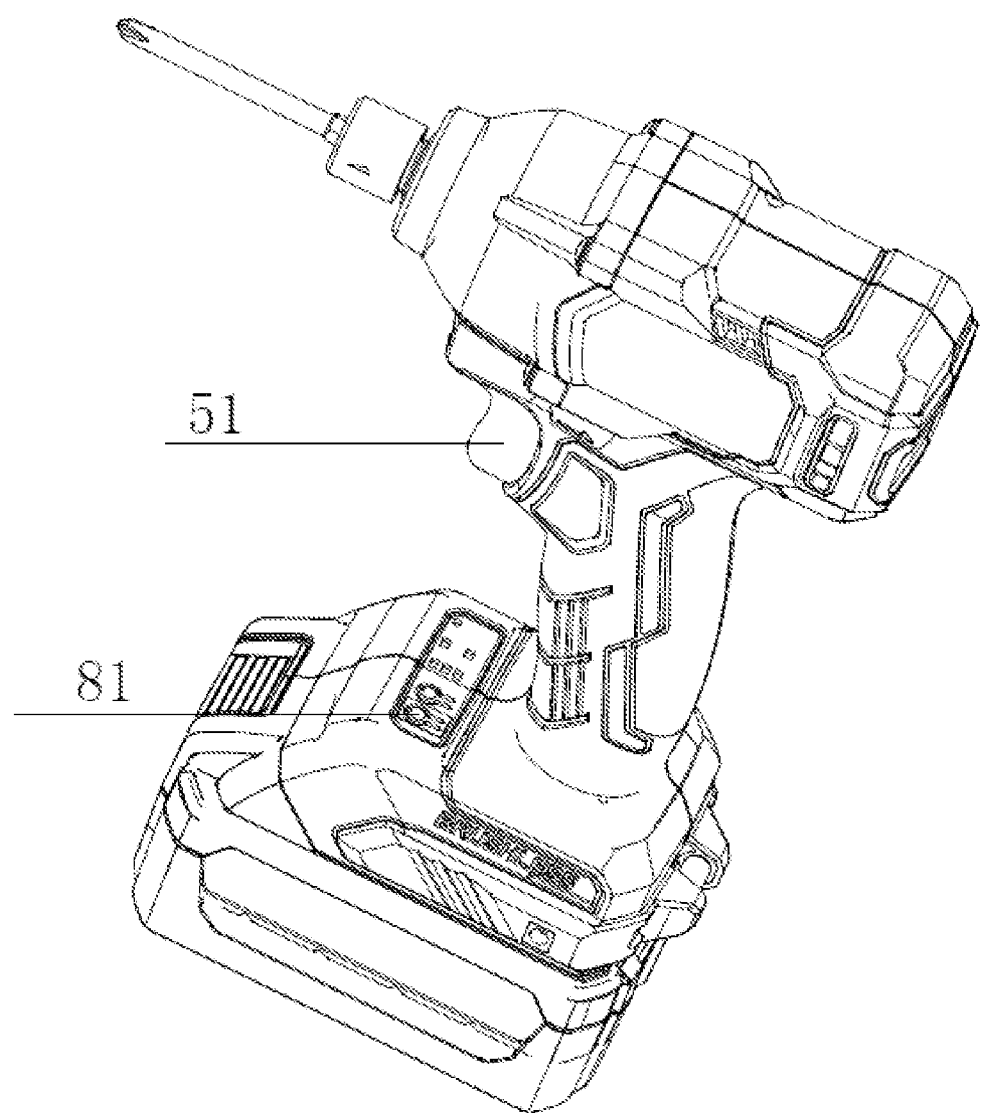
FIG. 4 is a perspective view of an application of the electric tool according to an embodiment of the present disclosure.

The present disclosure may be applied to electric tools such as an electric drill, an impact driver, and so on, and the electric drill may be shown in FIG. 4.

The present disclosure is not limited to the above specific embodiments, ordinary skilled person in the art can easily understand that, without departing from the principles and scope of the present disclosure, the system and the method of controlling the speed of the electric tool may have various other alternatives, the scope of the present disclosure is determined by the content of the claims.

What is claimed is:

1. A system of adjusting a speed of an electric tool, comprising: a power supply module, a motor, a controller, and an inverter,
   wherein the power supply module is connected to the inverter, the inverter is connected to the motor and the controller; the controller is connected to a switch fixed-speed module, a rotational speed display module, and a fixed-speed prompting module;
   the switch fixed-speed module comprises a switch trigger connected to the controller and is configured to set a target operating speed of the motor based on the amount of turned-on stroke of the switch trigger; wherein the switch fixed-speed module is configured to adjust a current operating speed of the motor based on the amount of the turn-on stroke of the switch trigger to cause the current operating speed to be equal to the target operating speed;
   the rotational speed displaying module is configured to display the current operating speed of the motor;
   the fixed-speed prompting module comprises at least one of an indicator lamp and a voice player; and the at least one of the indicator lamp and the voice player is configured to prompt a setting state of the target operating speed;
   when the switch trigger is pulled after the target operating speed is set, the electric tool is configured to operate at the target operating speed.

2. The system of adjusting the speed of the electric tool according to claim 1, wherein the rotational speed displaying module comprises a display connected to the controller, the current operating speed is displayed on the display.

3. The system of adjusting the speed of the electric tool according to claim 1, wherein the fixed-speed prompting module employs one of an indicator module and a voice prompting module.

4. The system of adjusting the speed of the electric tool according to claim 1, wherein the indicator lamp comprises an LED lamp, the setting state of the target operating speed is displayed by the LED lamp; and
   the voice player is configured to broadcast the setting state of the target operating speed.

5. The system of adjusting the speed of the electric tool according to claim 1, wherein the setting state of the target operating speed comprises a being-set state and a setting-finished state.

6. The system of adjusting the speed of the electric tool according to claim 1, wherein the switch trigger is a resistance-variable type of switch.

7. The system of adjusting the speed of the electric tool according to claim 1, wherein the controller comprises a computing module, a storage unit connected to the computing module, and a timing unit connected to the computing module;
   the storage unit stores the current operating speed corresponding to the amount of the turned-on stroke of the switch trigger and a duration threshold for which the switch trigger is being pressed and the amount of the turned-on stroke of the switch trigger is kept constant;
   the computing module is configured to calculate the amount of the turned-on stroke of the switch trigger and to obtain the target operating speed by corresponding the calculated amount of the turned-on stroke to the current operating speed;
   the timing unit is configured to time a duration for which the switch trigger is being pressed and the amount of the turned-on stroke of the switch trigger is kept constant;
   the computing module is further configured to control the setting state of the target operating speed by comparing the duration timed by the timing unit to the duration threshold.

8. The system of adjusting the speed of the electric tool according to claim 1, wherein the controller is connected to a mode switching module to control an operating mode of the motor;
   the operating mode comprises a normal mode and an intelligent fixed-speed mode, the normal mode is configured to control a real-time operating speed of the motor based on the amount of the turn-on stroke of the switch trigger; and
   the intelligent fixed-speed mode is configured to set the target operating speed based on the switch fixed-speed module, the rotational speed displaying module, and the fixed-speed prompting module.

9. The system of adjusting the speed of the electric tool according to claim 8, wherein the mode switching module comprises a mode button, the mode button is configured to control the motor to be switched between the normal mode and the intelligent fixed-speed mode.

10. A method of adjusting a speed of an electric tool, comprising:
- S1, powering up the electric tool, the electric tool entering a normal mode;
- S2, the normal mode being switched into an intelligent fixed-speed mode by pressing a mode button, adjusting a current operating speed of a motor of the electric tool to be equal to a target operating speed by continually adjusting the amount of turned-on stroke of a switch trigger and by monitoring the current operating speed displayed on a display, wherein the current operating speed of the motor is adjusted based on the amount of the turned-on stroke of the switch trigger;
- S3, in the intelligent fixed-speed mode, a LED lamp being continuously flashing, or a voice player providing a prompt indicating that the target operating speed is in a being-set state, in response to the current operating speed being equal to the target operating speed and a duration being less than a duration threshold; wherein the duration is timed by the electric tool for a time length that the switch trigger is being pressed and the amount of the turned-on stroke of the switch trigger is kept constant;
- S4, the LED lamp emitting light constantly or the voice player providing a prompt indicating that the target operating speed is in the setting-finished state, in response to the current operating speed being equal to the target operating speed and the duration being greater than or equal to the duration threshold;
- S5, after the target operating speed being finished setting, the switch trigger being pressed and then released, and the electric tool operating at the target operating speed.

11. An electric tool, comprising: a motor and a controller configured to adjust an operating speed of the motor,
- wherein the controller is connected to a switch fixed-speed module, a rotational speed display module, and a fixed-speed prompting module;
- the switch fixed-speed module comprises a switch trigger connected to the controller and is configured to set a target operating speed of the motor based on the amount of turned-on stroke of the switch trigger; wherein the switch fixed-speed module is configured to adjust a current operating speed of the motor based on the amount of the turn-on stroke of the switch trigger to cause the current operating speed to be equal to the target operating speed;
- the rotational speed displaying module is configured to display the current operating speed of the motor;
- the fixed-speed prompting module comprises at least one of an indicator lamp and a voice player; and the at least one of the indicator lamp and the voice player is configured to prompt a setting state of the target operating speed;
- when the switch trigger is pulled after the target operating speed is set, the electric tool is configured to operate at the target operating speed.

12. The electric tool according to claim 11, wherein the rotational speed displaying module comprises a display connected to the controller, the current operating speed is displayed on the display.

13. The electric tool according to claim 11, wherein the fixed-speed prompting module employs one of an indicator module and a voice prompting module.

14. The electric tool according to claim 11, wherein the indicator lamp comprises an LED lamp, the setting state of the target operating speed is displayed by the LED lamp;
- the voice player is configured to broadcast the setting state of the target operating speed.

15. The electric tool according to claim 11, wherein the setting state of the target operating speed comprises a being-set state and a setting-finished state.

16. The electric tool according to claim 11, wherein the switch trigger is a resistance-variable type of switch.

17. The electric tool according to claim 11, wherein the controller comprises a computing module, a storage unit connected to the computing module, and a timing unit connected to the computing module;
- the storage unit stores the current operating speed corresponding to the amount of the turned-on stroke of the switch trigger and a duration threshold for which the switch trigger is being pressed and the amount of the turned-on stroke of the switch trigger is kept constant;
- the computing module is configured to calculate the amount of the turned-on stroke of the switch trigger and to obtain the target operating speed by corresponding the calculated amount of the turned-on stroke to the current operating speed;
- the timing unit is configured to time a duration for which the switch trigger is being pressed and the amount of the turned-on stroke of the switch trigger is kept constant;
- the computing module is further configured to control the setting state of the target operating speed by comparing the duration timed by the timing unit to the duration threshold.

18. The electric tool according to claim 11, wherein the controller is connected to a mode switching module to control an operating mode of the motor;
- the operating mode comprises a normal mode and an intelligent fixed-speed mode, the normal mode is configured to control a real-time operating speed of the motor based on the amount of the turn-on stroke of the switch trigger; and
- the intelligent fixed-speed mode is configured to set the target operating speed based on the switch fixed-speed module, the rotational speed displaying module, and the fixed-speed prompting module.

19. The electric tool according to claim 18, wherein the mode switching module comprises at least a mode button, the mode button is configured to control the motor to be switched between the normal mode and the intelligent fixed-speed mode.

\* \* \* \* \*